(12) United States Patent
Okura et al.

(10) Patent No.: US 12,102,023 B2
(45) Date of Patent: Oct. 1, 2024

(54) COUPLING DEVICE

(71) Applicant: Kubota Corporation, Osaka (JP)

(72) Inventors: Kohei Okura, Osaka (JP); Shinnosuke Ishikawa, Osaka (JP); Noriyuki Koshida, Osaka (JP)

(73) Assignee: Kubota Corporation, Osaka (JP)

( * ) Notice: Subject to any disclaimer, the term of this patent is extended or adjusted under 35 U.S.C. 154(b) by 543 days.

(21) Appl. No.: 17/463,804

(22) Filed: Sep. 1, 2021

(65) Prior Publication Data

US 2022/0078960 A1 Mar. 17, 2022

(30) Foreign Application Priority Data

Sep. 16, 2020 (JP) .................................. 2020-155566

(51) Int. Cl.
*A01B 59/06* (2006.01)
*A01B 63/111* (2006.01)

(52) U.S. Cl.
CPC ........ *A01B 59/068* (2013.01); *A01B 63/1117* (2013.01)

(58) Field of Classification Search
CPC ........................ A01B 59/068; A01B 63/1117
See application file for complete search history.

(56) References Cited

U.S. PATENT DOCUMENTS

| 7,054,731 | B1 | 5/2006 | Lange et al. |
| 2004/0124605 | A1 | 7/2004 | McClure et al. |
| 2010/0006308 | A1 | 1/2010 | Schmidt et al. |
| 2010/0198444 | A1 | 8/2010 | Jensen |

FOREIGN PATENT DOCUMENTS

JP 2014-64582 A 4/2014

OTHER PUBLICATIONS

Partial European Search Report issued in corresponding European Patent Application 21195206.4 dated Feb. 3, 2022 (16 pages).

*Primary Examiner* — Tara Mayo
(74) *Attorney, Agent, or Firm* — Osha Bergman Watanabe & Burton LLP

(57) ABSTRACT

A coupling device includes: a first connector that connects to a work vehicle; a second connector that connects to a work device; an actuator that changes a connecting position of at least one of the first connector and the second connector; and a control device that controls the actuator.

13 Claims, 12 Drawing Sheets

| Performance data | Model |
|---|---|
| Work-vehicle position | |
| Steering angle | |
| Steering direction | |
| Travel line | Position estimation model |
| Connection information (Length, installation position of connecting member) | |

FIG. 8A

| Work-vehicle position || Apparatus position ||||
|---|---|---|---|---|---|
| Latitude | Longitude | Latitude | Longitude | Latitude | Longitude |
| 34.558555 | 135.470169 | 34.558541 | 135.470175 | 34.558541 | 135.470161 |
| 34.558569 | 135.470169 | 34.558551 | 135.470175 | 34.558551 | 135.470161 |
| 34.558583 | 135.470169 | 34.558561 | 135.470175 | 34.558561 | 135.470161 |
| 34.558597 | 135.470169 | 34.558571 | 135.470175 | 34.558571 | 135.470161 |
| 34.558611 | 135.470169 | 34.558581 | 135.470175 | 34.558581 | 135.470161 |
| . | . | . | . | . | . |
| . | . | . | . | . | . |
| . | . | . | . | . | . |

FIG. 8B

| Work-vehicle position || Apparatus position ||||
|---|---|---|---|---|---|
| Latitude | Longitude | Latitude | Longitude | Latitude | Longitude |
| 34.558555 | 135.470169 | 34.558544 | 135.470175 | 34.558544 | 135.470161 |
| 34.558569 | 135.470169 | 34.558554 | 135.470175 | 34.558554 | 135.470161 |
| 34.558583 | 135.470169 | 34.558564 | 135.470175 | 34.558564 | 135.470161 |
| 34.558597 | 135.470169 | 34.558574 | 135.470175 | 34.558574 | 135.470161 |
| 34.558611 | 135.470169 | 34.558584 | 135.470175 | 34.558584 | 135.470161 |
| . | . | . | . | . | . |
| . | . | . | . | . | . |
| . | . | . | . | . | . |

COUPLING DEVICE

BACKGROUND

Technical Field

The present invention relates to a coupling device that connects, for example, a work vehicle and a work device.

Description of Related Art

Conventionally, as a coupling device that connects a work device to a work vehicle such as a tractor, patent literature 1 is known. The coupling device of patent literature 1 is provided with a connecting frame that is equipped, so as to be able to be raised and lowered, to a rear portion of a tractor car body and with an engaging portion that is provided in an upper portion of the connecting frame and engages an engaged portion provided on a work-machine side. As for the work device, the work device can be connected by the engaging portion swinging around the engaged portion.

PATENT LITERATURE

[Patent Literature 1] JP 2014-64582 A

As illustrated by the coupling device of patent literature 1, a coupling device is a device configured to connect a work device to a rear portion of a tractor. Generally, the work device can be raised and lowered by raising and lowering the coupling device by a raising and lowering device provided in a rear portion on a tractor side. Here, in the raising and lowering by the raising and lowering device, the reality is that a hydraulic cylinder, a control valve, and the like are provided on the tractor side such that the work device is raised and lowered only via raising and lowering control from the tractor; positional changing or the like of the work device, such as raising and lowering the work device, cannot be performed by other methods.

SUMMARY

Thus, one or more embodiments of the present invention provide a coupling device that can change a position of a work device relative to a work vehicle.

Technical means of the present invention have the following characteristic features. The coupling device is a coupling device, provided with: a first connecting portion (i.e., a first connector) that connects to a work vehicle that can travel; a second connecting portion (i.e., a second connector) that connects to a work device; an actuator that can change a connecting position of either among the first connecting portion and the second connecting portion; and a control device that controls the actuator.

The control device controls the connecting position based on a travel line of the work vehicle.

The control device changes the connecting position so this connecting position matches the travel line.

The control device controls the connecting position based on a work-vehicle position of the work vehicle and the travel line of the work vehicle.

When a deviation between the work-vehicle position and the travel line is (or becomes) no less than (i.e., equal to or greater than) a threshold, the control device changes the connecting position in a direction of eliminating the deviation.

When a change of an attitude (or a posture) of the work device is (or becomes) no less than (i.e., equal to or greater than) a threshold during travel of the work vehicle, the connecting position is controlled so the attitude falls within the threshold.

The control device controls the connecting position based on a travel performance (or a travel history) that includes a work-vehicle position of the work vehicle and a device position of the work device.

The control device computes (or calculates) a trajectory of the device position based on the travel performance, changes a connecting position at a time of travel of the work vehicle so as to match the trajectory when the trajectory is appropriate for a field, and changes the connecting position at the time of travel of the work vehicle so as to differ from the trajectory when the trajectory is inappropriate for the field.

The control device controls the connecting position based on an environment surrounding the work vehicle or the work device.

The control device estimates a work-vehicle position of the work vehicle based on the connecting position of the first connecting portion.

The control device estimates a device position of the work device based on the connecting position of the second connecting portion.

The coupling device has a global positioning system.

According to one or more embodiments of the present invention, a position of a work device relative to a work vehicle can be changed.

BRIEF DESCRIPTION OF DRAWINGS

FIG. 8A A diagram illustrating one example of a travel performance.

FIG. 8B A diagram illustrating another example of the travel performance.

DETAILED DESCRIPTION

In the following, embodiments of the present invention are described based on the drawings.

Figure 12:
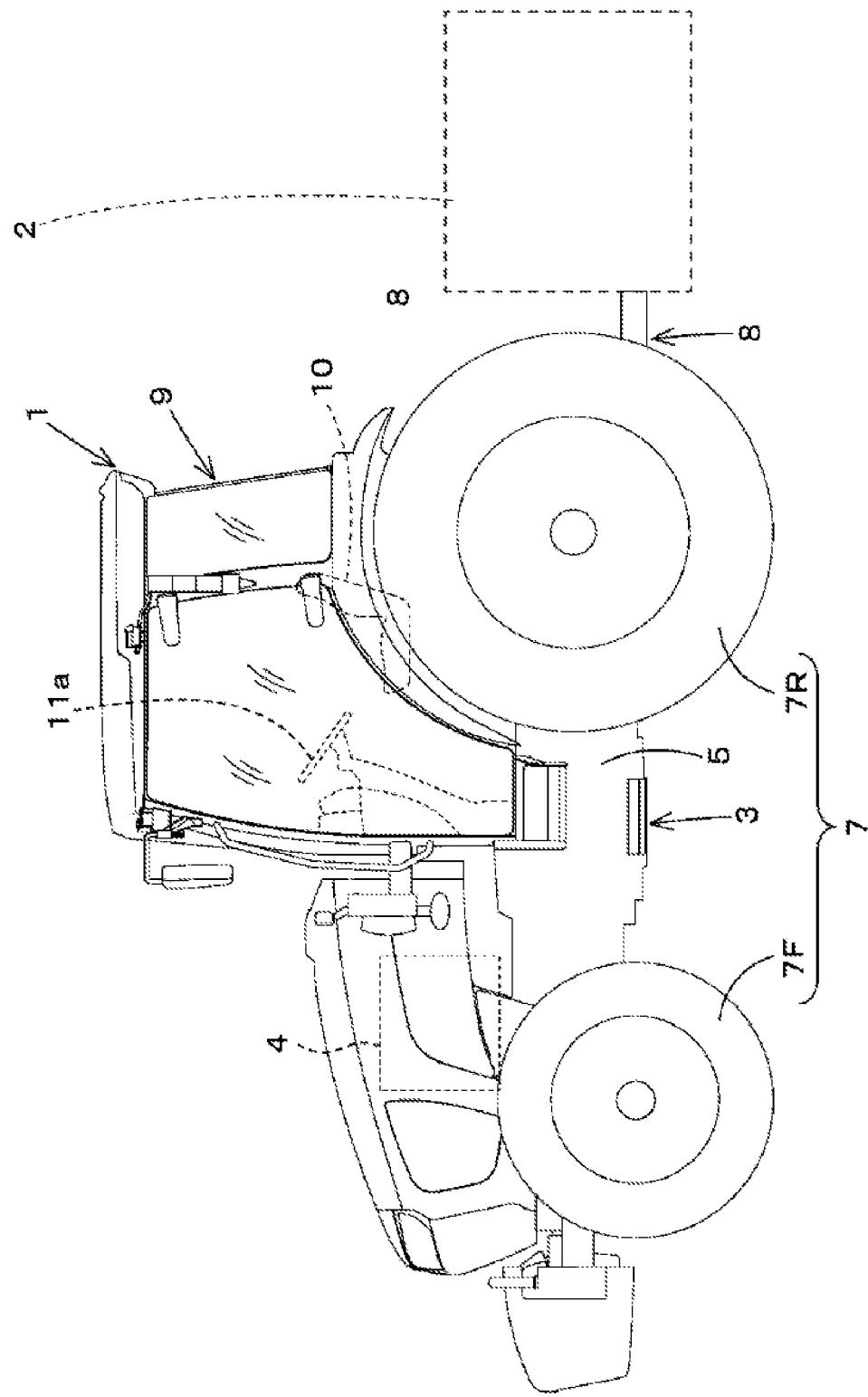
FIG. 12 A diagram illustrating a side view of the tractor.

FIG. 12 illustrates a state wherein a work device 2 is connected to a work vehicle 1.

First, a tractor 1, which is one work vehicle, is described.

As illustrated in FIG. 12, the tractor 1 is provided with a traveling car body 3, which has a traveling device 7; a motor 4; and a transmission device 5. The traveling device 7 is a device that has a front wheel 7F and a rear wheel 7R. The front wheel 7F may be a tire type or a crawler type. Furthermore, the rear wheel 7R may also be a tire type or a crawler type. The motor 4 is a diesel engine, an electric motor, or the like. The transmission device 5 can switch a propulsion of the traveling device 7 by shifting gears and can switch between forward and backward motion of the traveling device 7. The traveling car body 3 is provided with a cabin 9, and a driver's seat 10 is provided in this cabin 9.

Furthermore, a coupling device 8 that connects the work device 2 (or couples the work device 2 to the work vehicle 1) is provided in a rear portion of the traveling car body 3. The coupling device is a raising and lowering device or the like that is constituted by a swing drawbar that connects the work device 2 and the traveling car body 3 and does not perform raising and lowering, a three-point link mechanism, and the like and performs raising and lowering. The work device 2 is detachable from the coupling device 8. By connecting the work device 2 to the coupling device 8, the traveling car body 3 can tow the work device 2. The work device 2 is a trailer that performs transport, a tilling device that performs tilling, a fertilizer spreading device that spreads a fertilizer, a transplanting device that plants seedlings, a watering device that performs watering, an agrochemical spreading device that spreads an agrochemical, a sowing spreading device that spreads seeds, a reaping device that reaps grass or the like, a dispersing device that disperses grass or the like, a grass collecting device that collects grass or the like, a shaping device that shapes grass or the like, a composite device that performs a plurality of operations, or the like.

Figure 1:
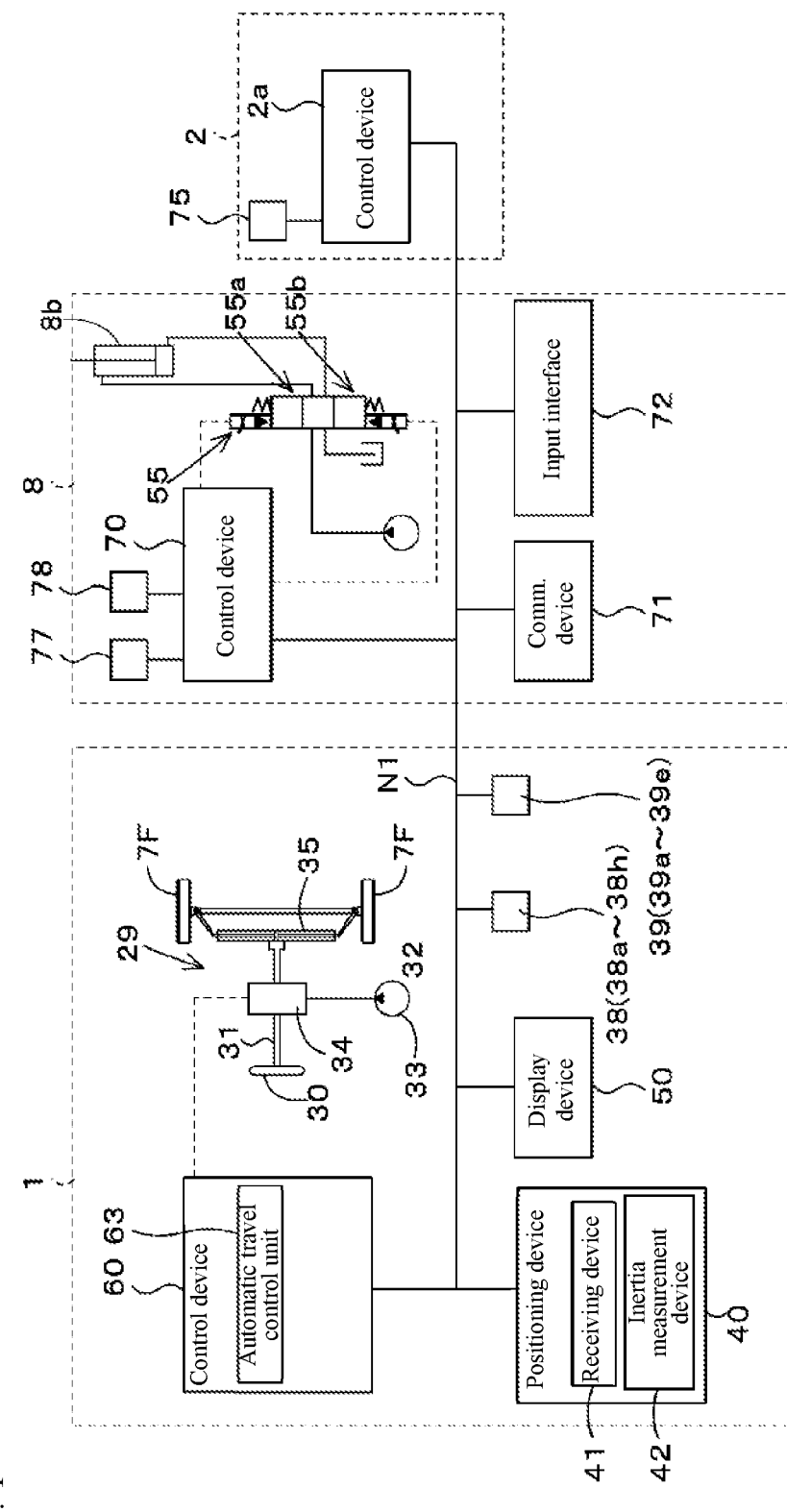
FIG. 1 A control block diagram of a tractor, a coupling device, and a work device.

FIG. 1 illustrates a control block diagram of the tractor 1, the coupling device 8, and the work device 2. The tractor 1 is provided with a steering device 29 as illustrated in FIG. 1. The steering device 29 has a steering wheel (steering wheel) 30, a rotation shaft (steering shaft) 31 that rotates in conjunction with rotation of the steering wheel 30, and an auxiliary mechanism (power steering mechanism) 32 that assists steering of the steering wheel 30. The auxiliary mechanism 32 includes a hydraulic pump 33, a control valve 34 where to a hydraulic fluid discharged from the hydraulic pump 33 is supplied, and a steering cylinder 35 actuated by the control valve 34. The control valve 34 is an electromagnetic valve actuated based on a control signal. The control valve 34 is, for example, a three-way switching valve that can be switched by movement of a spool or the like. Furthermore, the control valve 34 can also be switched by steering the steering shaft 31. The steering cylinder 35 is connected to an arm (knuckle arm) that changes an orientation of the front wheel 7F.

Accordingly, if the steering wheel 30 is operated, a switching position and degree of opening of the control valve 34 switch according to this steering wheel 30, and the steering cylinder 35 extends and retracts to the left or right according to the switching position and degree of opening of this control valve 34. By this, a steering direction of the front wheel 7F can be changed. Note that the steering device 29 described above is one example and not limited to the configuration described above.

The tractor 1 is provided with a positioning device 40. The positioning device 40 can detect its own position (positioning information that includes latitude and longitude) by a satellite positioning system (positioning satellite) such as D-GPS, GPS, GLONASS, BeiDou, Galileo, or Michibiki—that is, a global positioning system. Namely, the positioning device 40 receives a satellite signal (position of the positioning satellite, transmission time, correction information, and the like) transmitted from the positioning satellite and detects a position (for example, latitude and longitude) of the tractor 1—that is, a work-vehicle position P10—based on the satellite signal. The positioning device 40 has a receiving device 41 and an inertia measurement device (IMU: inertial measurement unit) 42. The receiving device 41 is a device that has an antenna or the like and receives a satellite signal transmitted from a positioning satellite and is installed to the traveling car body 3 separately from the inertia measurement device 42. In one or more embodiments, the receiving device 41 is installed to the traveling car body 3—that is, the cabin 9. Note that the installation location of the receiving device 41 is not limited to the above embodiments.

The inertia measurement device 42 has an acceleration sensor that detects acceleration, a gyro sensor that detects angular velocity, and the like. The traveling car body 3 is, for example, provided below the driver's seat 10 and can detect roll, pitch, and yaw angles and the like of the traveling car body 3 by the inertia measurement device 42.

The tractor 1 is provided with a plurality of detection devices 38, a plurality of operation members (operation devices) 39, and a control device (first control device) 60 as illustrated in FIG. 1. The plurality of detection devices 38, the positioning device 40, and the first control device 60 are connected by an in-vehicle network N1, and the first control device 60 can acquire detection information detected by the plurality of detection devices 38 and the work-vehicle position (position information) detected by the positioning device 40. The first control device 60 can acquire operation information of when the plurality of operation members (operation devices) 39 operates.

The plurality of detection devices 38 is devices that detect a state of the tractor 1 and is, for example, a water temperature sensor 38a that detects a water temperature, a fuel sensor 38b that detects a remaining quantity of fuel, a motor rotation sensor (rotation sensor) 38c that detects a rotation speed of the motor 4, an accelerator pedal sensor 38d that detects an operation amount of an accelerator pedal, a steering angle sensor 38e that detects a steering angle of the steering device 29, a speed sensor 38f that detects a vehicle speed (speed) of the traveling car body 3, a PTO rotation sensor (rotation sensor) 38g that detects a rotation speed of a PTO shaft, and a battery sensor 38h that detects a voltage of a storage cell such as a battery.

Furthermore, the tractor 1 is provided with the plurality of operation members (operation devices) 39. The plurality of operation members 39 is a shuttle lever 39a that switches between forward and backward motion of the traveling car body 3, an ignition switch 39b that performs starting or the like of the motor 4, a PTO transmission lever 39c that sets the rotation speed of the PTO shaft, a transmission lever 39d that manually switches a transmission stage (transmission level) of the transmission device 5, an accelerator 39e that increases or decreases the vehicle speed, and the like.

The first control device 60 performs various controls of the tractor 1. The first control device 60, for example, controls the motor rotation speed according to the operation amount of the accelerator pedal, controls a clutch that switches between forward and backward motion provided in the transmission device 5 when the traveling car body 3 is switched to forward or backward motion, and performs a control of changing the transmission stage of the transmission device 5 when the transmission stage is changed by the transmission lever 39*d*. Furthermore, in a situation of performing manual driving, the first control device 60 performs a control of steering the steering device 29 according to the steering angle of the steering device 29.

Figure 2:
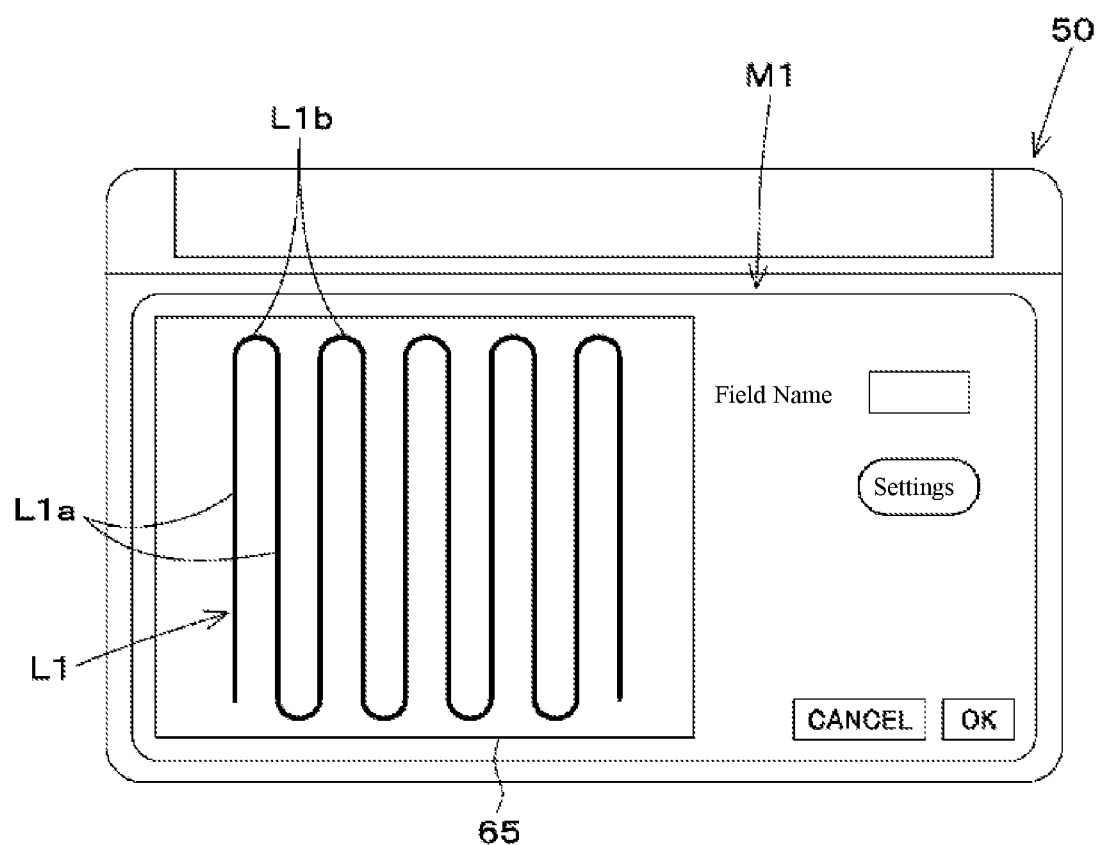
FIG. 2 A diagram illustrating one example of a creation screen M1.

The tractor 1 can perform automatic driving, and this automatic driving is performed based on a preset travel line L1. As illustrated in FIG. 2, the travel line L1 of automatic driving can be displayed by a display device 50 provided in the tractor 1.

As illustrated in FIG. 2, when a predetermined operation is performed with regard to the display device 50, a creation screen M1 for the travel line L1 is displayed. The creation screen M1 includes a field portion 65 having position information (latitude, longitude) assigned thereto. Here, when a predetermined operation is performed with regard to the display device 50, a straightaway portion L1*a*, wherein the tractor 1 advances linearly, and a turning portion L1*b* can be set as the travel line L1 in the field portion 65.

Automatic driving can be performed by the first control device 60. The first control device 60 has an automatic driving control unit 63 that controls automatic driving.

Figure 3:
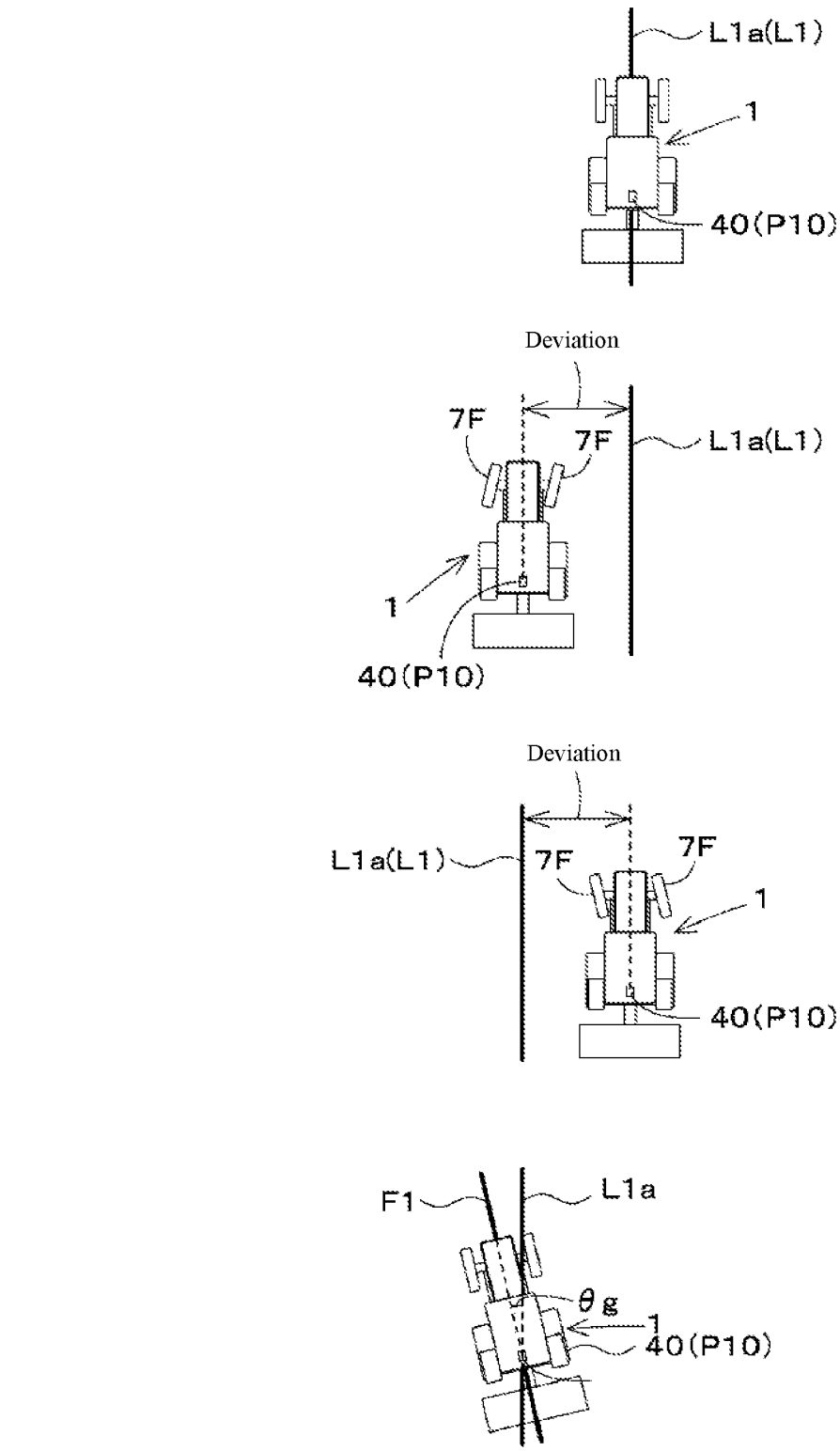
FIG. 3 An explanatory diagram for describing automatic driving of the tractor.

The automatic driving control unit 63 starts automatic driving when an automatic driving mode is entered into. As illustrated in FIG. 3, in a situation wherein the tractor 1 is performing automatic driving, when a deviation between the work-vehicle position P10 and the travel line L1 is less than a threshold, the automatic driving control unit 63 maintains a rotation angle of the steering shaft (rotation shaft) 31. When the deviation between the work-vehicle position P10 and the travel line L1 is no less than the threshold and the tractor 1 is positioned on a left side of the travel line L1, the automatic driving control unit 63 rotates the steering shaft 31 so a steering direction of the tractor 1 becomes a rightward direction. When the deviation between the work-vehicle position P10 and the travel line L1 is no less than the threshold and the tractor 1 is positioned on a right side of the travel line L1, the automatic driving control unit 63 rotates the steering shaft 31 so the steering direction of the tractor 1 becomes a leftward direction. Note that although in the above embodiments the steering angle of the steering device 29 is changed based on the deviation between the work-vehicle position P10 and the travel line L1, when an orientation of the travel line L1 and an orientation (car-body orientation) F1 of an advancing direction (travel direction) of the tractor 1 (traveling car body 3) differ—that is, when an angle θg of the car-body orientation F1 relative to the travel line L1 is no less than a threshold—the automatic driving control unit 63 may set the steering angle so the angle θg becomes zero (the car-body orientation F1 matches the orientation of the travel line L1). Moreover, the automatic driving control unit 63 may set a final steering angle in automatic steering based on a steering angle computed according to the positional deviation and a steering angle computed according to orientation (orientational deviation). The setting of the steering angle in automatic steering in the above embodiments is one example, and the present invention is not limited thereto.

Figure 4A:
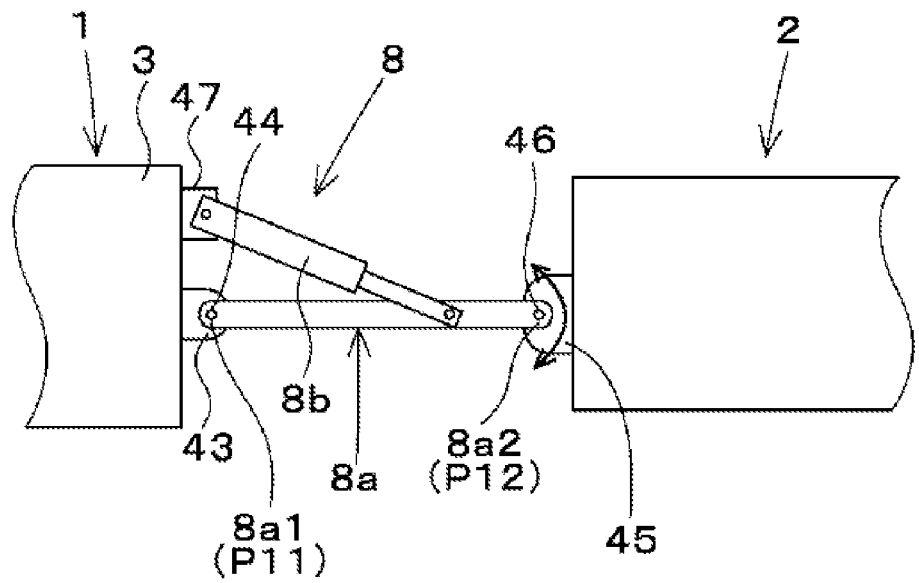
FIG. 4A A diagram illustrating one example of the coupling device.

As illustrated in FIG. 4A, the coupling device 8 is, for example, a towing hitch and has a connecting member 8*a* and an actuator 8*b*. The connecting member 8*a* is a member connecting the tractor 1 and the work device 2 and is a member formed in a rod shape. The connecting member 8*a* includes a first connecting portion 8*a*1 and a second connecting portion 8*a*2.

The first connecting portion 8*a*1 is a part that connects to the tractor 1 and is pivotably supported, so as to be able to swing, by a vertical shaft 44 provided to a bracket 43 provided in a rear portion of the tractor 1. For example, by a through hole penetrating in a vertical direction being formed in the first connecting portion 8*a*1 and the vertical shaft 44 being inserted into the through hole, the first connecting portion 8*a*1 is connected to the rear portion of the tractor 1. Note that the bracket 43 is provided to, for example, a transmission case or differential case of the transmission device 5.

The second connecting portion 8*a*2 is a part that connects to the work device 2 and is pivotably supported, so as to be able to swing, by a vertical shaft 46 provided to a bracket 45 provided in a front portion of the work device 2. For example, by a through hole penetrating in the vertical direction being formed in the second connecting portion 8*a*2 and the vertical shaft 46 being inserted into the through hole, the second connecting portion 8*a*2 is connected to the front portion of the work device 2.

As illustrated in FIG. 4A, the actuator 8*b* can change a connecting position P12 of the second connecting portion 8*a*2. The actuator 8*b* is, for example, a hydraulic cylinder that can extend and retract. One end of the actuator (hydraulic cylinder) 8*b* is pivotably supported, so as to be able to swing, by a bracket 47 provided to the tractor 1. Another end of the actuator (hydraulic cylinder) 8*b* is pivotably supported, so as to be able to swing, by a midway portion (intermediate portion between the first connecting portion 8*a*1 and the second connecting portion 8*a*2) of the connecting member 8*a*. Therefore, by extending and retracting the actuator (hydraulic cylinder) 8*b*, the connecting position P12 of the second connecting portion 8*a*2 can be changed.

Figure 4B:
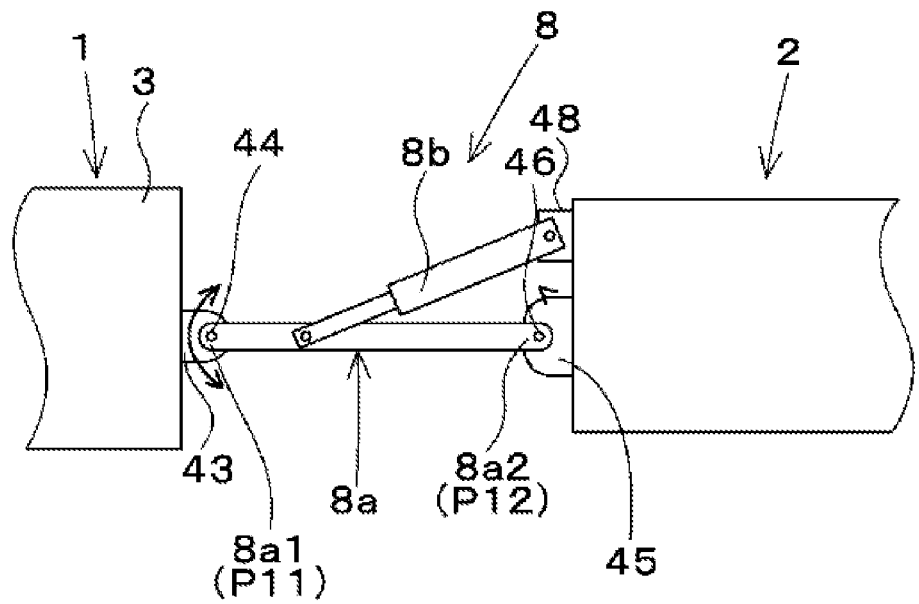
FIG. 4B A diagram illustrating another example of the coupling device.

As illustrated in FIG. 4B, the actuator (hydraulic cylinder) 8*b* may be provided between the connecting member 8*a* and the work device 2. As illustrated in FIG. 4B, one end of the actuator (hydraulic cylinder) 8*b* is pivotably supported, so as to be able to swing, by a bracket 48 provided to the work device 2. Another end of the actuator (hydraulic cylinder) 48 is pivotably supported, so as to be able to swing, by a midway portion of the connecting member 8*a*. Therefore, by extending and retracting the actuator (hydraulic cylinder) 8*b*, a connecting position P11 of the first connecting portion 8*a*1 can be changed.

As illustrated in FIG. 1, the coupling device 8 is provided with a control valve 55 that controls extension and retraction of the hydraulic cylinder 8*b*. The control valve 55 is, for example, an electromagnetic valve that can switch between three positions. When the control valve 55 is switched from a neutral position to one position (first position) 55*a*, the hydraulic cylinder 8*b* extends, and when the control valve 55 is switched from the neutral position to another position (second position) 55*b*, the hydraulic cylinder 8*b* retracts.

As illustrated in FIG. 1, the coupling device 8 is provided with a control device (second control device) 70. The second control device 70 is constituted by a CPU, electronic and electrical circuits, and the like. The second control device 70 switches a position of the control valve 55 and controls extension and retraction of the hydraulic cylinder 8*b* by outputting a control signal to a solenoid of the control valve 55.

The second control device 70 is connected to an in-vehicle network N1 provided on a tractor 1 side. The second control device 70 can acquire tractor 1 side information—for example, detection information, the work-vehicle position (position information), and operation information. Note that as illustrated in FIG. 1, when the work device 2 is provided with a control device (third control device) 2a, the second control device 70 can acquire via the in-vehicle network N1, for example, various information (operational information) of the work device 2 transmitted from the third control device 2a.

Figure 5A:
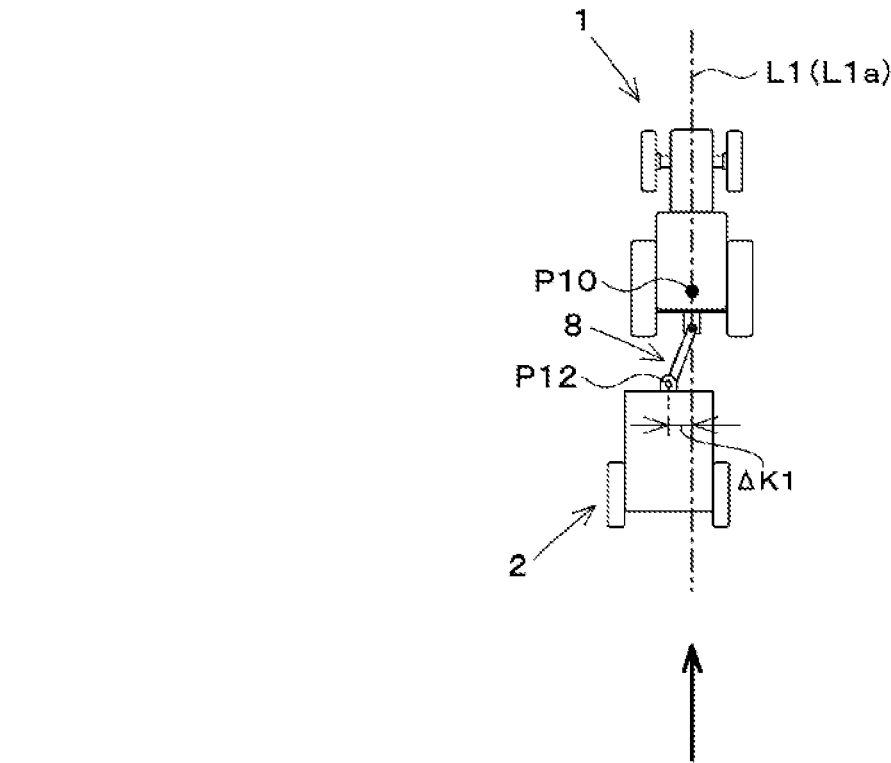
FIG. 5A A diagram illustrating an appearance of automatic driving.
Figure 5A:
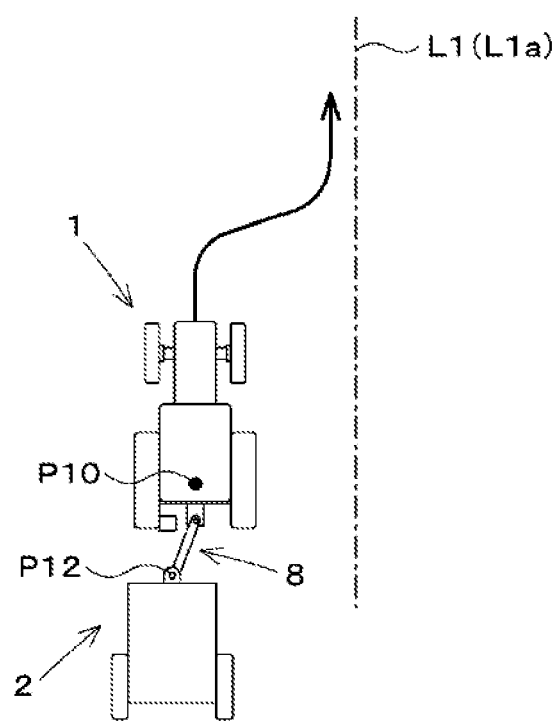
Figures 5B, 6:
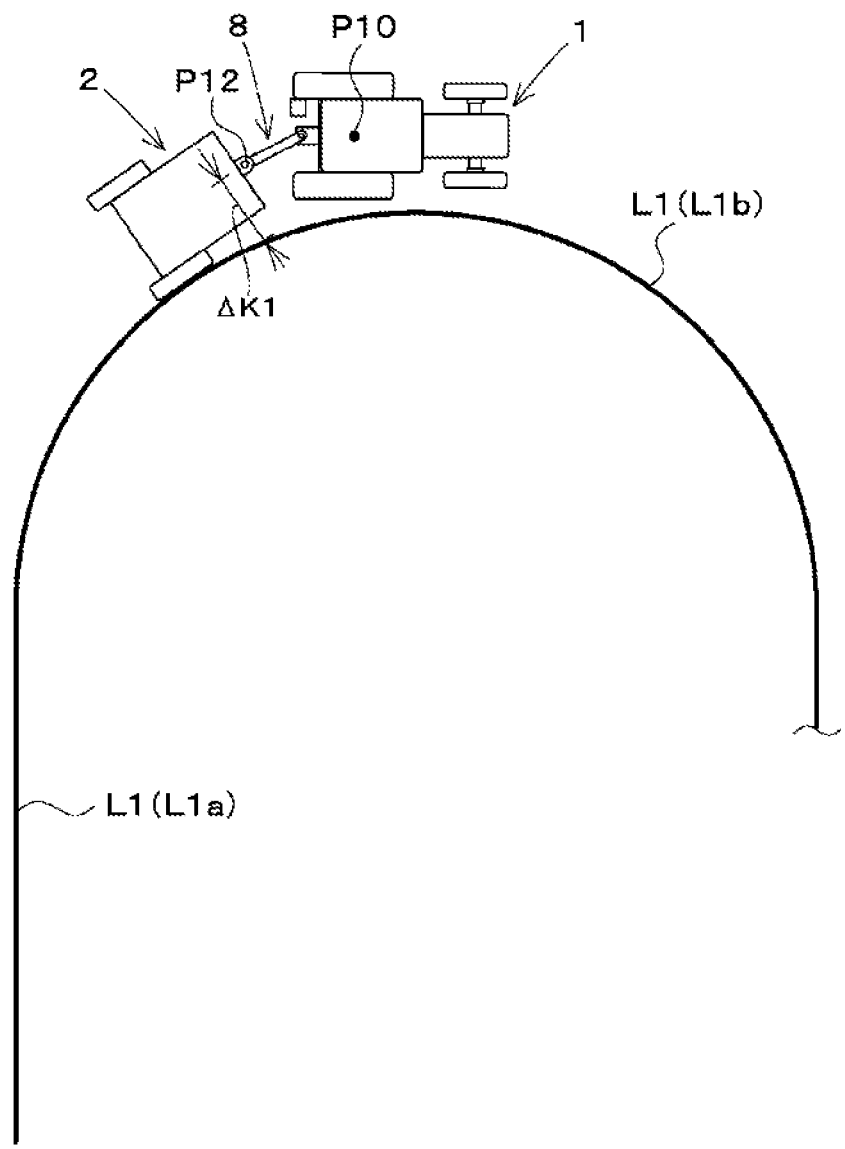
FIG. 5B A diagram illustrating an appearance of automatic driving at a time of turning.
FIG. 6 A diagram illustrating one example of performance data.

FIG. 5A and FIG. 5B are diagrams illustrating an appearance of automatic driving.

As illustrated in FIG. 5A and FIG. 5B, the second control device 70 controls the connecting position P12 based on the travel line L1 of when the tractor 1 is performing automatic driving. That is, the second control device 70 changes the connecting position P12 so this connecting position P12 matches the travel line L1 at a time of automatic travel.

Hereinbelow, control of the connecting position P12 at a time of automatic driving of the tractor 1 is described in detail.

In performing automatic driving, the second control device 70 acquires, prior to automatic driving being started, the travel line L1 (straightaway portion L1a, turning portion L1b) via the in-vehicle network N1. Then, when automatic driving is started, the second control device 70 estimates a position of the connecting position P12 relative to the travel line L1 and changes the connecting position P12 so the estimated connecting position P12 matches the travel line L1.

As illustrated in FIG. 5A, in automatic driving, when the work-vehicle position P10 of the tractor 1 does not match the travel line L1 (straightaway portion L1a), the automatic driving control unit 63 performs a control of steering the tractor 1 leftward so the work-vehicle position P10 of the tractor 1 matches the travel line L1 (straightaway portion L1a). Here, when no control by the second control device 70 is performed in a situation wherein the work-vehicle position P10 of the tractor 1 matches the travel line L1 (straightaway portion L1a), the connecting position P12 (position of the work device 2) may not match the travel line L1.

Furthermore, as illustrated in FIG. 5B, in automatic driving, when the work-vehicle position P10 of the tractor 1 does not match the travel line L1 (turning portion L1b), in this situation as well, the automatic driving control unit 63 performs a control of steering the tractor 1 leftward so the work-vehicle position P10 of the tractor 1 matches the travel line L1 (straightaway portion L1a). Here, when no control by the second control device 70 is performed, the connecting position P12 (position of the work device 2) may not match the travel line L1. That is, in automatic travel of the tractor 1, when no control by the second control device 70 is performed, the connecting position P12 (position of the work device 2) may not match the travel line L1.

Therefore, independently of the automatic driving control unit 63, the second control device 70 performs a control of extending and retracting the hydraulic cylinder 8b so a positional deviation ΔK1 between the connecting position P12 (position of the work device 2) and the travel line L1 becomes zero (so the positional deviation ΔK1 is eliminated).

For example, as illustrated in FIG. 5A, when the connecting position P12 (position of the work device 2) is shifted to the left of the travel line L1, the second control device 70 outputs to the control valve 55 a signal to retract the hydraulic cylinder 8b in order to shift the connecting position P12 to the right so this matches the travel line L1 (straightaway portion L1a). Furthermore, as illustrated in FIG. 5B, when the connecting position P12 (position of the work device 2) is shifted to the left of the travel line L1 (turning portion L1b), in this situation as well, the second control device 70 outputs to the control valve 55 a signal to retract the hydraulic cylinder 8b in order to shift the connecting position P12 to the right so this approaches the travel line L1 (turning portion L1b).

Now, estimation of the position of the connecting position P12 by the second control device 70 is performed according to a model for estimating this position of the connecting position P12 (position estimation model). The position estimation model is, for example, a learned model constructed by artificial-intelligence deep learning. To construct the position estimation model, past performance data of when automatic driving was performed is used. As illustrated in FIG. 6, the position estimation model can be constructed by inputting, to various computers that perform artificial-intelligence deep learning, performance data such as the work-vehicle position P10, the steering angle, the steering direction, the travel line L1, and connection information (length of the connecting member 8a, installation position of the connecting member 8a) from when automatic driving is performed.

In constructing the position estimation model, the position estimation model may be constructed by preparing in advance a positioning device that can position the connecting position P12, storing actual positions of the connecting position P12 positioned by the positioning device as teaching data for the connecting position P12, adding the teaching data to the performance data, and using a computer to perform deep learning. Alternatively, a configuration may be such that the connecting position P12 can be estimated by deep learning, without input of teaching data (actual positions); a construction method of the learned model is not limited.

Furthermore, the coupling device 8 is provided with a communication device 71 having a wireless connection to an external device such as a personal computer, a mobile terminal, or a server, and an input interface 72 having a wired connection to a personal computer, a mobile terminal, an electronic storage medium, and the like. The coupling device 8 acquires the position estimation model and the connection information by connecting the communication device 71 and an external device via wireless communication. Alternatively, the coupling device 8 acquires the position estimation model and the connection information by connecting an external device to the input interface 72. When the coupling device 8 acquires the position estimation model, the acquired position estimation model and connection information are stored in the second control device 70. The position estimation model and the connection information may be acquired from the tractor 1 via the in-vehicle network N1.

That is, the second control device 70 has the above position estimation model and connection information and estimates the connecting position P12 by applying the work-vehicle position P10, the steering angle, the steering direction, the travel line L1, and the connection information to the position estimation model. Moreover, the second control device 70 extends and retracts the hydraulic cylinder 8b so the positional deviation ΔK1 between the estimated connecting position P12 and the travel line L1 at the time of automatic driving becomes zero—that is, in a direction of eliminating the positional deviation ΔK1.

Note that in the above embodiments, a control of matching the connecting position P12 to the travel line L1 is performed without accounting for the positional deviation between the work-vehicle position P10 and the travel line L1. However, the hydraulic cylinder 8b may be extended and retracted in the direction of eliminating the positional deviation ΔK1 when the positional deviation between the work-vehicle position P10 and the travel line L1 is no less than a preestablished threshold.

Moreover, when automatic driving of the tractor 1 is performed, the second control device 70 may acquire a current work-vehicle position P10, steering angle, steering direction, and travel line L1 and, based on the acquired work-vehicle position P10, steering angle, steering direction, and travel line L1, perform reinforcement learning of the learned model (position estimation model).

Note that although the work-vehicle position P10, the steering angle, the steering direction, the travel line L1, and the connection information are made to be the input data in constructing the position estimation model, the input data are not limited thereto. For example, at least the work-vehicle position P10, the travel line L1, and the connection information may be made to be the input data, and other parameters may be parameters other than the steering angle and the steering direction and are not limited.

According to the above, when performing automatic driving of the tractor 1 by the second control device 70, the connecting position P12 (position of the work device 2) can be controlled independently of the tractor 1.

Now, in the above embodiments, the connecting position P12 is changed according to automatic driving of the tractor 1. However, the second control device 70 may change the connecting position P12 based on a past travel performance of the tractor 1 and the work device 2.

Figure 7:
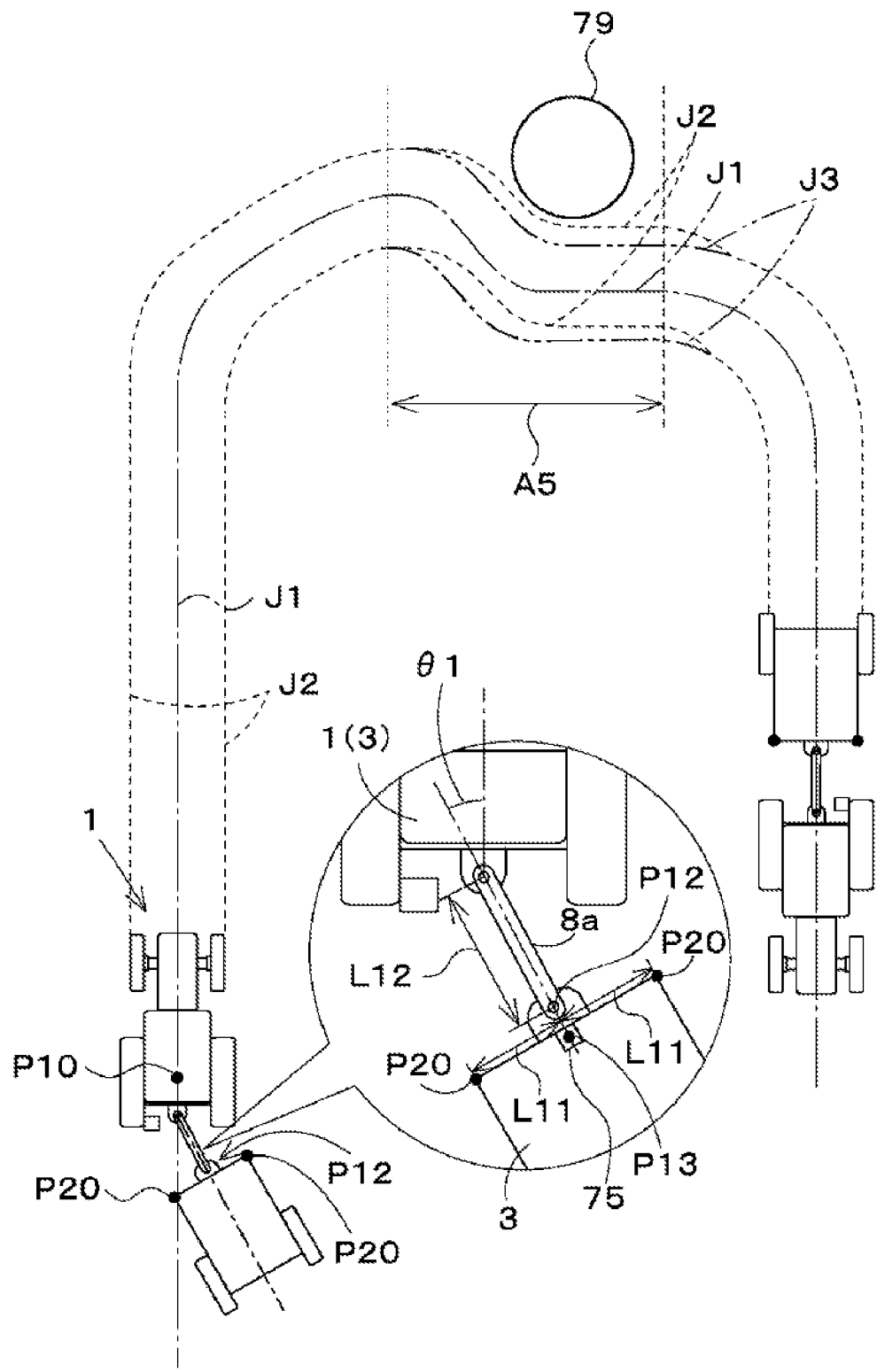
FIG. 7 A diagram illustrating a state wherein the tractor is towing the work device and performing automatic travel.

The second control device 70 controls the connecting position P12 based on a travel performance that includes the work-vehicle position P10 of the tractor and a device position P20 of the work device 2. As illustrated in FIG. 7, the device position P20 of the work device 2 is positions of both end portions in a width direction of the work device 2. A calculation method of the device position P20 of the work device 2 can be found by the following first method and second method. Calculation of the device position P20 of the work device 2 is computed by the second control device 70.

As illustrated in FIG. 1 and FIG. 7, in the first method, a positioning device 75 of the same configuration as the positioning device 40 can be provided in advance in the work device 2, and positions separated by a predetermined distance L11 in the width direction from a positioning position P13 positioned by this positioning device 75 can be made to be the device position P20 of the work device 2.

In the second method, the device position P20 can be computed by providing an angle detection device that can detect an angle θ1 of the connecting member 8a relative to the tractor 1, finding the connecting position P12 based on the angle θ1 detected by the angle detection device and a length L12 of the connecting member 8a, and adding and subtracting distances from the connecting position P12 to both end portions in the width direction of the work device 2 (distance X1 in the width direction, distance Y1 in the advancing direction). Note that although the device position P20 of the work device 2 differs slightly between the above first method and second method, either may be adopted. The above calculation methods of the device position P20 of the work device 2 are examples, and the present invention is not limited thereto.

FIG. 8A illustrates one example of data wherein when the tractor 1 is traveling, the second control device 70 computes the device position P20 by the first method, and the computed device position P20 and the work-vehicle position P10 are stored as the travel performance in the second control device 70. FIG. 8B illustrates one example of data wherein when the tractor 1 is traveling, the second control device 70 computes the device position P20 by the second method, and the computed device position P20 and the work-vehicle position P10 are stored as the travel performance in the second control device 70.

Now, when the work device 2 is connected to the tractor 1 to perform work, the second control device 70 refers to a past travel performance of the same field and, as illustrated in FIG. 7, computes trajectories J1, J2 of the work-vehicle position P10 and the device position P20. The trajectory J1 is a trajectory of the work-vehicle position P10, and the trajectory J2 is a trajectory of the device position P20.

Regarding the second control device 70, when travel of the tractor 1 starts, the second control device 70 refers to a device position P20 such as that illustrated in FIG. 7 to compute a past trajectory J2 from this device position 20 and, by comparing a current device position P20 and the past trajectory J2, monitors a current travel state of the work device 2 and a past travel state of the work device 2.

As illustrated in FIG. 7, when the trajectory J2, which is a past travel performance, and an obstacle 79 in the field are separated by a predetermined distance or greater during travel of the tractor 1, the second control device 70 determines that the trajectory J2 is appropriate and changes the connecting position P12 so the current device position P20 matches the trajectory J2. Meanwhile, when the trajectory J2 and the obstacle 79 in the field are not separated by the predetermined distance or greater, the second control device 70 determines that a trajectory J3 of the work device 2 is inappropriate for the field and changes the connecting position P12 of when the tractor 1 is traveling to differ from the trajectory J2.

For example, in section A5 in FIG. 7, the trajectory J2 is too close to the obstacle 79. As such, when the work device 2 is positioned in section A5, as illustrated by the trajectory J3 in section A5, the second control device 70 changes a position of the device position P20 by extending and retracting the hydraulic cylinder 8b so the device position P20 moves away from the obstacle 79. Note that the obstacle 79 is a water treatment installation (drainpipe, water supply pipe, water supply and drainage gutter) positioned in the field, a tree planted in the field, a levee, or the like. However, the obstacle 79 is not limited thereto. Moreover, the obstacle 79 may be registered together with the travel line L1 by designating a location in the field portion 65 when creating the travel line L1 of automatic driving. Alternatively, it may be detected by an obstacle detection sensor that detects obstacles at a time of automatic driving so a position detected by this obstacle detection sensor is registered; a registration method and the like of the obstacle are not limited.

In the above embodiments, the second control device 70 of the coupling device 8 changes the position of the connecting position P12 so the obstacle 79 is not approached, but the present invention is not limited thereto.

In the above embodiments, the second control device 70 acquires the work-vehicle position P10, positioned by the positioning device 40, via the in-vehicle network N1 or the like. However, the second control device 70 may estimate the work-vehicle position P10 of the tractor 1 based on the connecting position P11 of the first connecting portion 8a1.

Figure 9A:
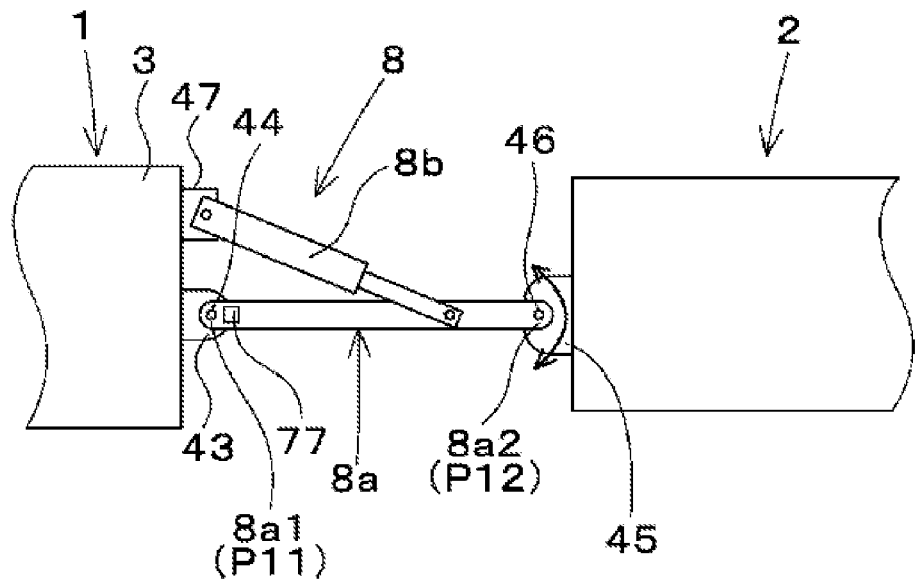
FIG. 9A A diagram illustrating one example of a coupling device provided with a positioning device.

As illustrated in FIG. 1 and FIG. 9A, the coupling device 8 is provided with a positioning device 77 that can position the connecting position P11 of the first connecting portion 8a1. Like the positioning device 40, the positioning device 77 can position the position (connecting position) P11 of the first connecting portion 8a1 by a global positioning system.

When, during travel of the tractor 1 and in a state wherein a stroke of the hydraulic cylinder 8b is fixed (state wherein the angle θ1 of the connecting member 8a relative to the tractor 1 is fixed), the connecting position P11 positioned by the positioning device 77 changes, the second control device 70 determines that a position of the tractor 1 has changed. That is, when the angle θ1 of the connecting member 8a is fixed during travel of the tractor 1, a position change of the connecting position P11 can be inferred to be a change in the work-vehicle position of the tractor 1.

The second control device 70 estimates a position of the positioning device 40 (work-vehicle position P10) by adding to and subtracting from the connecting position P11 positioned by the positioning device 77 a distance from this positioning device 77 to the positioning device 40 of the tractor 1 (distance X2 in the width direction, distance Y2 in the advancing direction). Note that even when the angle θ1 of the connecting member 8a relative to the tractor 1 changes, the second control device 70 can compute (estimate) a position corresponding to the positioning device 40—that is, the work-vehicle position P10—by correcting the distance X2 in the width direction and the distance Y2 in the advancing direction according to the angle θ1.

As above, when the coupling device 8 can estimate the work-vehicle position P10 of the tractor 1, the second control device 70 can change the connecting position P12 without acquiring the work-vehicle position P10 from the tractor 1.

Figure 9B:
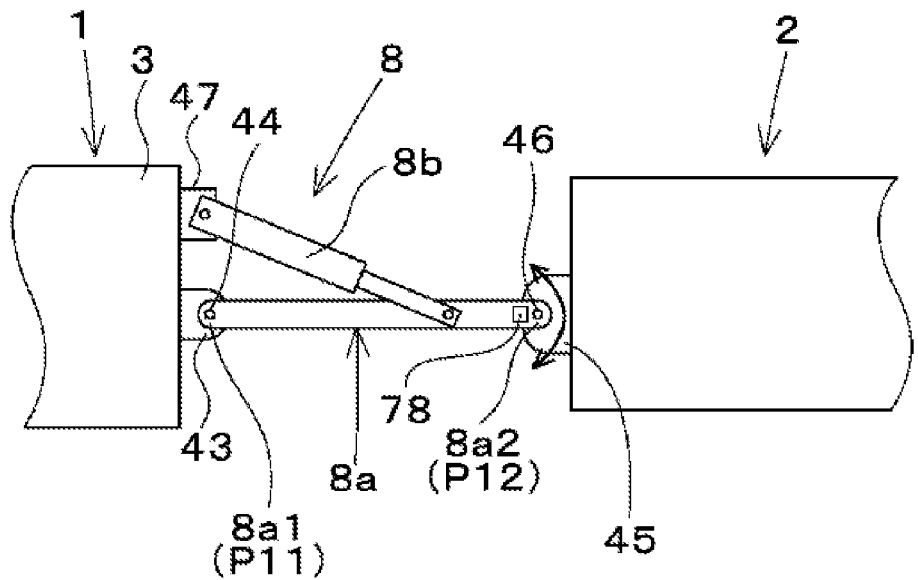
FIG. 9B A diagram illustrating another example of a coupling device provided with a positioning device.

In the above embodiments, in finding the device position P20, a position positioned by the positioning device 75 is used. However, instead, as illustrated in FIG. 1 and FIG. 9B, the device position P20 may be found by a positioning device 78 that can position the connecting position P12 of the second connecting portion 8a2.

Like the positioning device 40, the positioning device 78 can position the position (connecting position) P12 of the second connecting portion 8a2 by a global positioning system.

When, during travel of the tractor 1 and in the state wherein the stroke of the hydraulic cylinder 8b is fixed, the connecting position P12 positioned by the positioning device 78 changes, the second control device 70 determines that the device position P20 of the work device 2 has changed. That is, in the state wherein the stroke of the hydraulic cylinder 8b is fixed during travel of the tractor 1, a position change of the connecting position P12 can be inferred to be a change in the device position P20 of the work device 2.

The second control device 70 can compute the device position P20 by adding and subtracting distances from the connecting position P12 positioned by the positioning device 78 to both end portions in the width direction of the work device 2 (distance X1 in the width direction, distance Y1 in the advancing direction). Note that when the stroke of the hydraulic cylinder 8b changes, a position corresponding to the positioning device 40—that is, the work-vehicle position P10—can be computed (estimated) by correcting the distance X1 in the width direction and the distance Y1 in the advancing direction.

In the above embodiments, the coupling device 8 is a swing drawbar that does not raise and lower the work device 2. However, instead, this may be a raising and lowering device that raises and lowers the work device 2.

Figure 10:
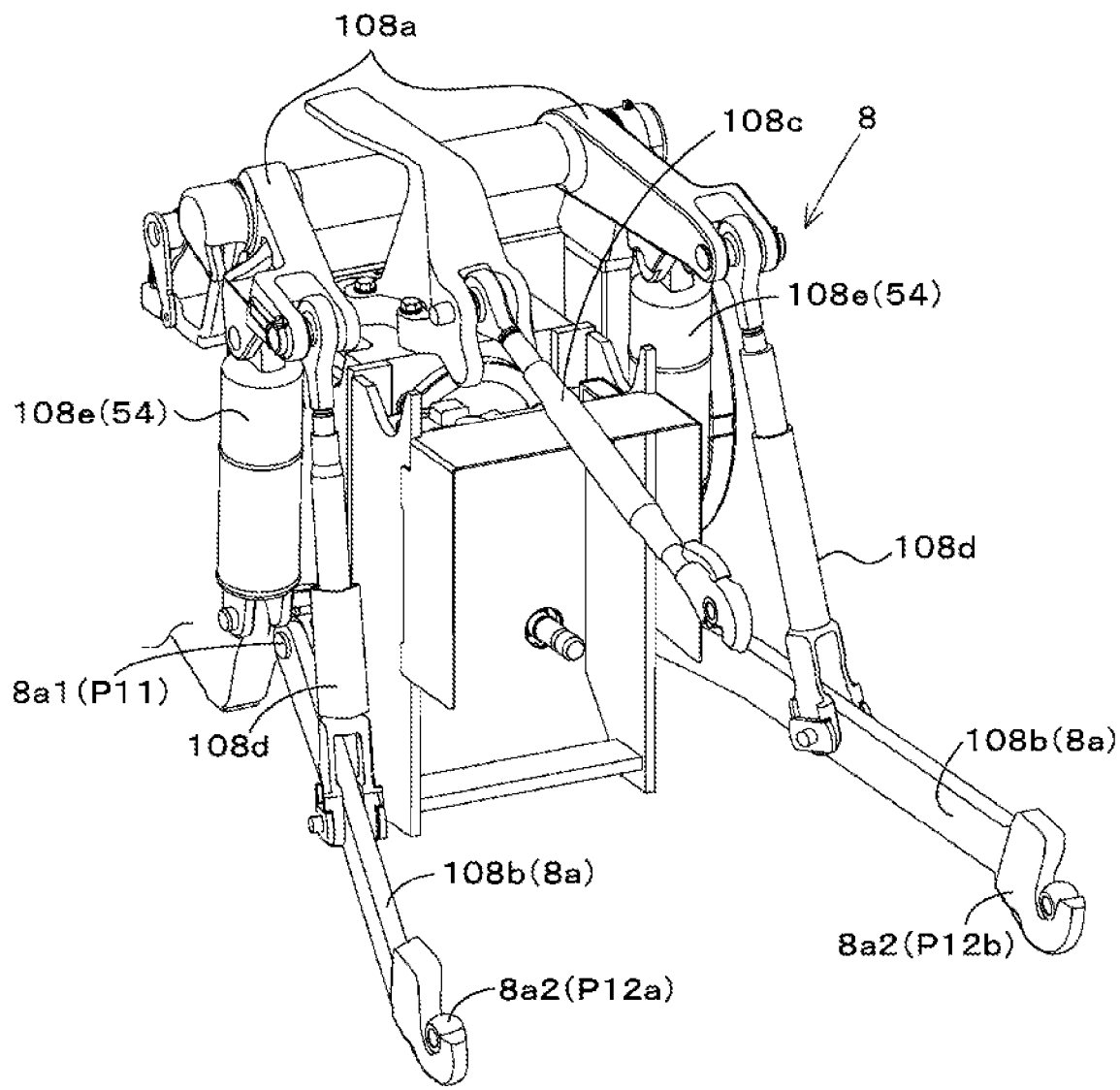
FIG. 10 A diagram illustrating a variation of the coupling device.

As illustrated in FIG. 10, the coupling device 8 has a lift arm 108a, a lower link 108b, a top link 108c, a lift rod 108d, and a lift cylinder 108e. A front end portion of the lift arm 108a is supported, so as to be able to swing, above or below an upper-rear portion of the case (transmission case) housing the transmission device 5. The lift arm 108a swings (is raised and lowered) by being driven by the lift cylinder 108e. The lift cylinder 108e is constituted from a hydraulic cylinder. The lift cylinder 108e is connected to a hydraulic pump via a control valve 34. The control valve 34 is an electromagnetic valve or the like and extends and retracts the lift cylinder 108e.

A front end portion of the lower link 108b is supported, so as to be able to swing, above or below a lower-rear portion of the transmission device 5. A front end portion of the top link 108c is supported, so as to be able to swing, above or below a rear portion of the transmission device 5, above the lower link 108b. The lift rod 108d connects the lift arm 108a and the lower link 108b. The work device 2 is connected to a rear portion of the lower link 108b and a rear portion of the top link 108c.

Furthermore, as illustrated in FIG. 10, at least one among a lift rod 108d on a left side and a lift rod 108d on a right side is constituted by a hydraulic cylinder that can extend and retract. By extending and retracting the lift rod 108d on the left side—or the lift rod 108d on the right side—constituted by the hydraulic cylinder in a state wherein the lift cylinder 108e is not extended and retracted, a relative position of a distal end of a lower link 108b on the left side and a distal end of a lower link 108b on the right side can be adjusted. In one or more embodiments, the lower link 108b on the right side is constituted by a hydraulic cylinder. As is obvious, the lower link 108b on the left side may be constituted by a hydraulic cylinder.

In the above variation, the lower link 108b corresponds to the connecting member 8a, the distal end (rear end) of the lower link 108b corresponds to the second connecting portion 8a2, and a proximal end (front end) of the lower link 108b corresponds to the first connecting portion 8a1. For convenience in description, a connecting position corresponding to the second connecting portion 8a2 of the distal end of the lower link 108b on the left side may be referred to as a "left connecting position P12a", and a connecting position corresponding to the second connecting portion 8a2 of the distal end of the lower link 108b on the right side may be referred to as a "right connecting position P12b".

Furthermore, the lift cylinder 108e and the lift rod 108d on the right side constituted by the hydraulic cylinder correspond to the hydraulic cylinder 8b.

Figure 11:
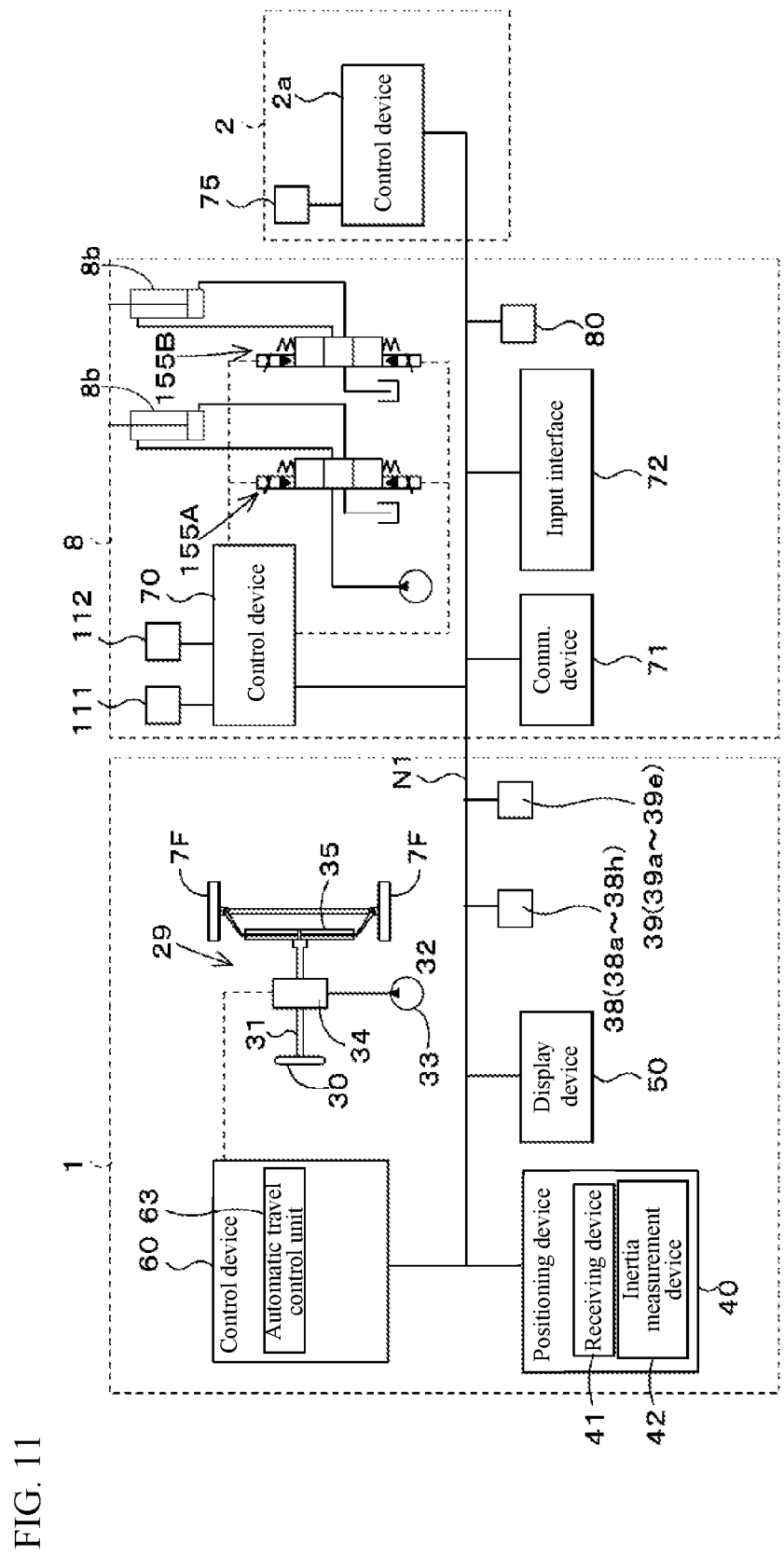
FIG. 11 A control block diagram for a variation of the tractor, the coupling device, and the work device.

FIG. 11 illustrates a control block diagram of the tractor 1, the coupling device 8, and the work device 2 in a variation.

As illustrated in FIG. 11, the coupling device 8 is provided with a control valve 155A that controls the lift cylinder 108e (hydraulic cylinder 8b) and a control valve 155B that controls the lift rod 108d on the right side (hydraulic cylinder 8b). Like the control valve 55 above, the control valves 155A, 155B are, for example, an electromagnetic valve that can switch between three positions.

The second control device 70 extends and retracts the lift cylinder 108e (hydraulic cylinder 8b) by outputting a control signal to a solenoid of the control valve 155A. For example, when the lift cylinder 108e (hydraulic cylinder 8b) is retracted, the lift rod 108d on the left side and the lift rod 108d on the right side are raised. In conjunction with this raising, the connecting positions P12a, P12b of the second connecting portion 8a2 also move upward. When the lift cylinder 108e (hydraulic cylinder 8b) is extended, the lift rod 108d on the left side and the lift rod 108d on the right side are lowered. In conjunction with this lowering, the connecting positions P12a, P12b of the second connecting portion 8a2 also move downward.

That is, by extending and retracting the lift cylinder 108e (hydraulic cylinder 8b), the connecting positions P12a, P12b are moved in the vertical direction, and by this, the work device 2 can be raised and lowered.

The second control device 70 extends and retracts the lift rod 108d on the right side (hydraulic cylinder 8b) by outputting a control signal to a solenoid of the control valve 155B. For example, when the lift rod 108d on the right side (hydraulic cylinder 8b) is retracted, the lift rod 108d on the right side is raised. In conjunction with this raising, the right connecting position P12b also moves upward. When the lift rod 108d on the right side (hydraulic cylinder 8b) is extended, the lift rod 108d on the right side is lowered. In conjunction with this lowering, the right connecting position P12b also moves downward.

That is, by extending and retracting the lift rod 108d on the right side (hydraulic cylinder 8b), the connecting position P12b moves in the vertical direction, and an inclination (inclination in the width direction) of the work device 2—that is, a width-direction attitude of the work device 2—can be changed.

Now, when the tractor 1 is made to travel, the second control device 70 monitors the inclination of the work device 2. The inclination of the work device 2 can be understood from a change in the left connecting position P12a. For example, the second control device 70 determines that the work device 2 is held horizontally when the left connecting position P12a in the vertical direction is the same as the right connecting position P12b in the vertical direction.

Furthermore, the second control device 70 determines that the work device 2 is inclined to the right in the width direction (rightwardly descending incline) when the left connecting position P12a is positioned above the right connecting position P12b. Moreover, the second control device 70 determines that the work device 2 is inclined to the left in the width direction (leftwardly descending incline) when the left connecting position P12a is positioned below the right connecting position P12b.

Here, when the attitude of the work device 2 changes to be no less than a threshold—that is, when a relative position of the left connecting position P12a and the right connecting position P12b in the vertical direction changes to be no less than the threshold—the left connecting position P12a is controlled so the attitude of the work device 2 falls within the threshold.

That is, when the work device 2 is inclined to the left or right by a predetermined angle or greater (inclined to be no less than the threshold), the second control device 70 causes movement in an upward direction or a downward direction so the left connecting position P12a approaches the right connecting position P12b such that the relative position in the vertical direction of the left connecting position P12a and the right connecting position P12b falls within the threshold. That is, the second control device 70 extends and retracts the lift rod 108d on the right side (hydraulic cylinder 8b) so the left connecting position P12a moves in a direction, within the vertical direction, of approaching the right connecting position P12b. Note that in detection of the left connecting position P12a of the lift rod 108d on the left side, the left connecting position P12a can be found by, for example, installing a position detection sensor 110 (inclination sensor, acceleration sensor, or the like) on a distal-end side of the lift rod 108d on the left side and having the second control device 70 convert a detection value of the position detection sensor 110 into the left connecting position P12a.

Furthermore, in detection of the right connecting position P12b of the lift rod 108d on the right side, as illustrated in FIG. 11, the right connecting position P12b can be found by, for example, installing a stroke sensor 111 that detects a stroke of the lift rod 108d on the right side and having the second control device 70 convert a detection value of the stroke sensor 111 into the right connecting position P12b. Note that this calculation method of the left connecting position P12a and the right connecting position P12b is one example, and the present invention is not limited thereto.

As illustrated in FIG. 11, the coupling device 8 may be provided with an environment measurement device 80 that measures an environment surrounding the tractor 1 or the work device 2. The environment measurement device 80 is a device that measures wind speed, wind direction, temperature, and the like.

The second control device 70 changes the left connecting position P12a and the right connecting position P12b of the coupling device 8 based at least on environment information (wind speed, wind direction, temperature) measured by the environment measurement device 80.

The second control device 70 has a work optimization model for determining optimal work in response to environmental changes. The work optimization model is a learned model constructed by artificial-intelligence deep learning. To construct the work optimization model, work data from when work was performed in the past is used. The work optimization model can be constructed by inputting, to various computers that perform artificial-intelligence deep learning, work data such as environmental information (wind speed, wind direction, temperature) from when work was performed, the attitude of the work device 2 (left connecting position P12a, right connecting position 12b), a height of the work device 2 (stroke of the lift cylinder 108e), and a type of the work device 2.

Note that as illustrated in FIG. 11, the height of the work device 2 can be obtained by installing a stroke sensor 112 that detects the stroke of the lift cylinder 108e and having the second control device 70 convert a detection value of the stroke sensor 112 into the height of the work device 2. The type of the work device 2 can be obtained from any among an external device, the tractor 1, and the work device 2.

In the tractor 1, when performing work, the second control device 70 applies the environment information measured by the environment measurement device 80, the attitude of the work device 2 (left connecting position P12a, right connecting position 12b), the height of the work device 2 (stroke of the lift cylinder 108e), and the type of the work device 2 to the work optimization model.

When a result determined by the work optimization model—that is, an attitude of the work device 2 and a height of the work device 2 for performing optimal work—is acquired, the second control device 70 changes the attitude of the work device 2 and the height of the work device 2 so these become the same as the result determined by the work optimization model. For example, when the type of the work device 2 is any among a fertilizer spreading device, an agrochemical spreading device, and a sowing spreading device, work of optimal spreading can be performed according to the wind speed and the wind direction. Moreover, in a situation wherein the work device 2 is a reaping device, a dispersing device, a grass collecting device, or a shaping device, when the work device 2 is inclined due to an inclination of the field, work can be performed by correcting the inclination of the work device 2 to an optimal inclination, regardless of the inclination of the field.

In the above embodiments, the coupling device 8 is described as changing the connecting positions P12, P12*a*, 12*b* of the second connecting portion 8*a*2. However, instead, as illustrated in FIG. 4B, in a situation of a mechanism wherein the connecting position P11 of the first connecting portion 8*a*1 can change, the coupling device 8 may change the position of the connecting position P11 of the first connecting portion 8*a*1. That is, by replacing "connecting position P12" with "connecting position P11" in the above embodiments, it is possible to change the position of the connecting position P11 by the second control device 70 according to automatic travel and the travel performance.

The coupling device 8 is provided with: the first connecting portion 8*a*1 that connects to the work vehicle 1 that can travel; the second connecting portion 8*a*2 that connects to the work device 2; the actuator 8*b* that can change the connecting position of either among the first connecting portion 8*a*1 and the second connecting portion 8*a*2; and the control device (second control device) 70 that controls the actuator 8*b*. Accordingly, the position of the work device 2 relative to the work vehicle 1 can be changed independently of the work vehicle 1 by changing the connecting position P11, P12 of either among the first connecting portion 8*a*1 and the second connecting portion 8*a*2 by controlling the actuator 8*b* by the control device (second control device) 70.

The coupling device 8 controls the connecting positions P11, P12 based on the travel line L1 of the work vehicle 1. Accordingly, when, for example, performing automatic driving, automatic steering, or the like along the travel line L1, the work device 2 can be positioned to follow this travel line L1. That is, regardless of whether the work vehicle 1 matches the travel line L1, the work device 2 can be made to follow the travel line L1, and work along the travel line L1 can be performed.

The coupling device 8 changes the connecting positions P11, P12 so these connecting positions P11, P12 match the travel line L1. Accordingly, the work device 2 can be made to match this travel line L1, and work along the travel line L1 can be performed.

The coupling device 8 controls the connecting positions P11, P12 based on the work-vehicle position P10 of the work vehicle 1 and the travel line L1 of the work vehicle 1. Moreover, when the deviation between the work-vehicle position P10 and the travel line L1 is no less than the threshold, the coupling device 8 changes the connecting positions P11, P12 in the direction of eliminating the deviation. Accordingly, when the work-vehicle position P10 of the work vehicle 1 is shifted from the travel line L1 (the deviation is no less than the threshold), at least the work device 2 can be made to approach the travel line L1.

When the attitude of the work device 2 changes to be no less than the threshold during travel of the work vehicle 1, the connecting positions P11, P12 are controlled so the attitude falls within the threshold. Accordingly, the attitude of the work device 2 can be held to be constant, and work can be performed in a stable attitude.

The coupling device 8 controls the connecting positions P11, P12 based on the travel performance that includes the work-vehicle position P10 of the work vehicle 1 and the device position P20 of the work device 2. Accordingly, the position of the work vehicle 1 and the work device 2 (connecting positions P11, P12) can be changed while comparing, on one hand, a work-vehicle position P10 of the work vehicle 1 and a device position P20 of the work device 2 that are a past travel performance and, on the other, a current work-vehicle position P10 and device position P20 of the work device 2, and a precision of work in the same field can be improved.

The coupling device 8 computes the trajectory J2 of the device position P20 based on the travel performance, changes the connecting positions P11, P12 at the time of travel of the work vehicle 1 so as to match the trajectory J2 when determining that the trajectory J2 is appropriate for the field, and changes the connecting positions P11, P12 at the time of travel of the work vehicle 1 so as to differ from the trajectory J2 when determining that the trajectory J2 is inappropriate for the field. Accordingly, in a situation of travel while towing the work device 2 by the work vehicle 1, when a past travel performance was favorable (when travel was performed appropriately), the same travel as the past travel performance can be performed, and when the past travel performance was not favorable (when travel was performed inappropriately), travel can be performed while correcting to more favorable travel compared to the travel of the past travel performance.

The coupling device 8 controls the connecting positions P11, P12 based on the environment surrounding the work vehicle 1 or the work device 2. Accordingly, when, for example, the work device 2 is a work device 2 of a spreading type, spreading work suited to the environment can be performed.

The coupling device 8 estimates the work-vehicle position P10 of the work vehicle 1 based on the connecting positions P11, P12 of the first connecting portion 8*a*1. Accordingly, even if the coupling device 8 does not acquire the work-vehicle position P10 from the work vehicle 1, this work-vehicle position P10 can be acquired, and, for example, the connecting positions P11, P12 can be adjusted by considering the estimated work-vehicle position P10.

The coupling device 8 estimates the device position P20 of the work device 2 based on the connecting positions P11, P12 of the second connecting portion 8*a*2. Accordingly, the device position P20 can be obtained even if the coupling device 8 does not acquire the device position P20 from the work device 2, and, for example, the connecting positions P11, P12 can be adjusted by considering the obtained device position P20.

The coupling device 8 has a global positioning system. Accordingly, the position of this coupling device 8 can be understood independently of the work vehicle 1 and the work device 2.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1: work vehicle (tractor)
2: work device
8: coupling device
8*a*1: first connecting portion
8*a*2: second connecting portion
8*b*: actuator
20: device position
J1: trajectory
J2: trajectory
J3: trajectory
L1: travel line P10: work-vehicle position
P11: connecting position
P12: connecting position
P12a: connecting position
P12b: connecting position
P20: device position

What is claimed is:

1. A coupling device comprising:
a first connector that has a first connecting position rotatably supported by a first vertical shaft of a work vehicle that comprises an automatic drive controller;
a second connector that has a second connecting position rotatably supported by a second vertical shaft of a work device;
an actuator that changes at least one of the first and second connecting positions; and
a control device that:
estimates, with a position estimation model, a positional relationship between a travel line of the work vehicle and at least one of the first and second connecting positions, and
during an automatic drive control, controls the actuator independently of the automatic drive controller to change at least one of the first and second connecting positions based on the positional relationship.

2. The coupling device according to claim 1, wherein the control device controls the actuator to change at least one of the first and second connecting positions to match the travel line.

3. The coupling device according to claim 1, wherein the control device controls the actuator to change at least one of the first and second connecting positions based on a work-vehicle position of the work vehicle and the travel line.

4. The coupling device according to claim 3, wherein when a deviation between the work-vehicle position and the travel line becomes equal to or larger than a threshold, the control device controls the actuator to change at least one of the first and second connecting positions in a direction of eliminating the deviation.

5. The coupling device according to claim 1, wherein when a change of a posture of the work device becomes equal to or larger than a threshold during travel of the work vehicle, the control device controls the actuator to change at least one of the first and second connecting positions such that the posture falls within the threshold.

6. The coupling device according to claim 1, wherein the control device controls the actuator to change at least one of the first and second connecting positions based on a travel history that includes a work-vehicle position of the work vehicle and a device position of the work device.

7. The coupling device according to claim 6, wherein the control device:
calculates a trajectory of the device position based on the travel history,
controls the actuator to change at least one of the first and second connecting positions at a time of travel of the work vehicle such that at least one of the first and second connecting positions match the trajectory when determining that the trajectory is appropriate for a field, and
controls the actuator to change at least one of the first and second connecting positions at the time of travel of the work vehicle such that at least one of the first and second connecting positions differ from the trajectory when determining that the trajectory is inappropriate for the field.

8. The coupling device according to claim 1, wherein the control device controls the actuator to change at least one of the first and second connecting positions based on an environment surrounding the work vehicle or the work device.

9. The coupling device according to claim 1, wherein the control device estimates a work-vehicle position of the work vehicle based on the first connecting position.

10. The coupling device according to claim 1, wherein the control device estimates a device position of the work device based on the second connecting position.

11. The coupling device according to claim 1, further comprising:
a positioning device that positions at least one of the first and second connecting positions by a global positioning system.

12. A work vehicle comprising:
the coupling device according to claim 1.

13. The work vehicle according to claim 12, wherein
the work vehicle is a tractor, and
the coupling device couples to the work vehicle, as the work device, at least one of a trailer, a tilling device, a fertilizer spreading device, a transplanting device, a watering device, an agrochemical spreading device, a sowing spreading device, a reaping device, a dispersing device, a grass collecting device, a shaping device, and a composite device.

* * * * *